June 29, 1937.  R. A. HEISING  2,085,218

DIRECTION INDICATING SYSTEM

Filed Aug. 4, 1934  3 Sheets-Sheet 1

Raymond A. Heising
INVENTOR

June 29, 1937.  R. A. HEISING  2,085,218
DIRECTION INDICATING SYSTEM
Filed Aug. 4, 1934  3 Sheets-Sheet 3

Raymond A. Heising
INVENTOR

Patented June 29, 1937

2,085,218

UNITED STATES PATENT OFFICE 2,085,218

DIRECTION INDICATING SYSTEM

Raymond A. Heising, Summit, N. J.

Application August 4, 1934, Serial No. 738,497

7 Claims. (Cl. 177—339)

This invention relates to a direction indicating system for automobiles and similar vehicles and a general object thereof is to improve devices of this general class.

Among the objects are to provide for giving a signal on the rear or other suitable portion of a vehicle indicating the direction in which the operator thereof is about to turn; to provide for the giving of such a signal by the simplest possible movement on the part of the operator, namely a substantially straight line movement of the finger or hand; to maintain a signal once set for a predetermined duration of time or a predetermined duration of travel; to permit cancellation of the signal at any time and the giving of a contrary or different signal, if desired; and to provide for the performance of these various functions in an arrangement in which positive visual or sound signals displayed before or located near the operator indicate any defect in the signaling apparatus, such as a burnt out lamp or a short circuit.

In embodiments or the invention two distinctive pilot or indicator devices such as lamps or bells are displayed before or located near the operator in addition to the main signaling lamps. One of these pilot devices upon being energized gives an indication that the circuit to each or either of the main signaling lamps is intact and that current is flowing therethrough. The other pilot device normally gives an indication only upon the occurrence of a defect in the system, such as a short circuit.

One embodiment of the invention is disclosed in Figs. 1 to 4 inclusive, of which Fig. 1 is a view partly in section of a casing containing the main operating elements for controlling the signals; Fig. 2 is a sectional view at right angles showing the cams for operating three contacts necessary to control the signal lights; Fig. 3 is a further view showing the cam arrangement for operating the green pilot light; and Fig. 4 is a schematic arrangement of the entire circuit.

Figure 4:
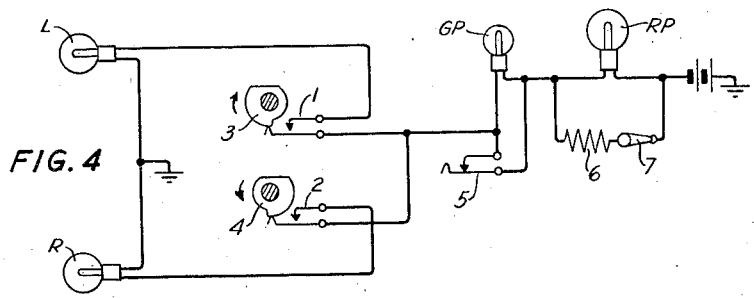

Adverting now to the arrangements of Figs. 1 to 4, inclusive, there is shown in Fig. 4 left and right direction turn indicating lamps L and R each controlled by their respective contacts 1 and 2, which contacts are connected to any battery on the vehicle by a circuit through the green pilot lamp GP and the red pilot lamp RP. The contacts 1 and 2 are controlled by cams 3 and 4. Pilot light GP is controlled by contact 5 which short circuits the light when closed and the pilot light RP is always in series circuit. The lights L and R will be illuminated by what we may call normal voltage or wattage, the light GP will be caused to glow by a relatively smaller current or wattage and the light RP is a high current or wattage lamp or it may be of medium wattage with a resistance 6 connected in parallel. A switch 7 is shown by which the resistance 6 may be connected into or disconnected from the circuit and it is understood that resistance 6 and switch 7 generally typify arrangements for connecting around the lamp RP resistance of such value that the lamp RP will not normally glow when a contact 1 or 2 is closed through the lamps L or R but will glow if there should be a short circuit to ground between the lamp RP and one of the lamps L, R.

The arrangements for operating the several lamps will now be described. A casing 8, which may be mounted on the steering post or in and near the convenient location, contains the contacts 1, 2 and 5. Also in the front or top of the casing are mounted the lamps GP and RP. An operating handle or finger piece 9 is mounted upon a part 10 for pivotal movement. Upon pushing the handle 9 to the right or the left a cam surface 11 upon part 10 causes the handle and part 10 which have a slight slidable movement upon the spindle 14 to move downward against the tension of the spring 12 and open the contact 5. Further movement of the handle to the right or left causes it to engage against one of the pins 13 to move the spindle 14 to the right or left which causes the cam 15 to depress the pivoted lever 16 and move the pawl 17 over the ratchet teeth 18 of a wheel 19. Upon release of the handle 9 the cam surface 11 immediately rides back into the central position with respect to its adjacent cam surface and the spring 20 tends to restore the lever 16 and the cam 15 to their original positions. However, the return of the lever 16 is delayed by an escapement mechanism which consists of a balance wheel 21 connected to a typical escapement device 22 which is geared to the wheel 19.

It will be seen, therefore, that movement of the handle 9 to the left or the right, as the case may be, will cause the low current green pilot lamp GP to flash during the time occupied in pushing the handle 9 to the left or right and the green light will stay lighted so long as the handle is maintained in either of its extreme positions. The selected light L or R will be illuminated during this time but will glow with slightly less than normal brilliancy. Upon release of the handle 9 the green light will go out due to closure of the contact 5 and the light L or R will glow with full brilliancy until the handle 9 is restored to a position where one of the cams 3 or 4 will open the contact 1 or 2 which happens to be closed. During all of these operations the light RP remains dark but if at any time a short circuit occurs between the light RP and ground this light will glow with full brilliancy and warn the operator that the signaling system is out of order. Upon the other hand, if one of the lights L or R should be burnt out or the circuit therethrough opened, the green light GP will not glow when it should and the operator will be equally informed that the system is not operating. Thus, also, for example, if a contact 1 or 2 should not close properly the green light GP will not glow.

Figure 5:
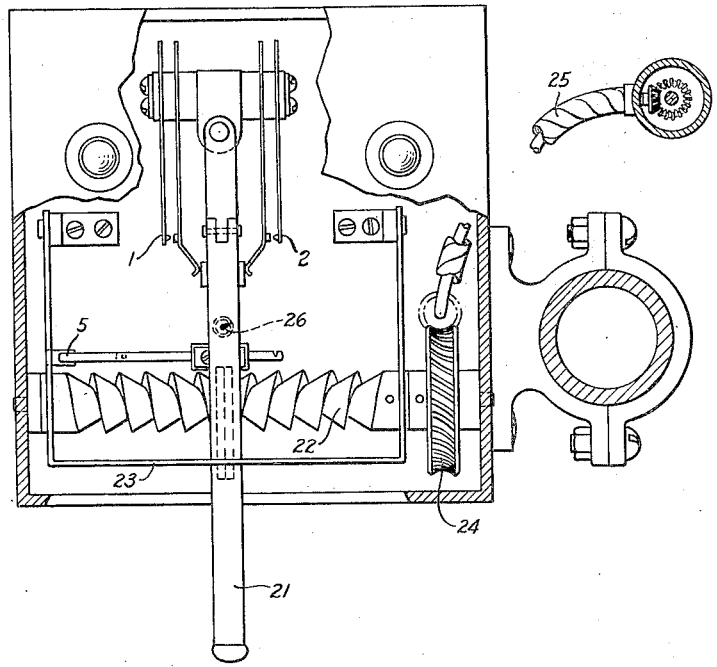
Fig. 5 is a modified form in which the signal lights are restored to their non-indicating position by movement of the vehicle and Fig. 6 is a simplified arrangement similar to that of Fig. 5.

The circuit arrangement of Fig. 4 is equally well adapted to work with the arrangement of Fig. 5 wherein the contacts 1 and 2 and the contact 5 perform the same functions as in Fig. 4 but are operated by different mechanism. In Fig. 5 the handle 21 normally rests in a depressed position in the middle of the spirally threaded member 22. Upon moving the handle to the left or right it rides over the threads of member 22 because the handle 21 is pivoted or made flexible for movement vertically as well as horizontally. Upon first moving the handle the contact 1 or 2 will be closed and upon riding over the first thread handle 21 will raise the pivoted bail 23 and open the contact 5, one element of which is mounted upon the bail. Upon reaching the extreme position the handle 21 will remain elevated and will retain the bail elevated to keep the contact 5 open for so long a time as the operator wishes. Upon release of the handle at any point away from its central position the spring 26 pulls it downwardly and centrally and the spiral threads of the member 22 will restore it to the central position because the member 22 is constantly rotating when the vehicle is in motion because it is driven through the beveled gear 24 to a flexible shaft 25 and suitable gearing arrangements. The shaft 25 and the gearing arrangements are indicated in a diagrammatic manner only because their actual construction would be well understood.

It is understood that the contacts 1, 2 and 5 are in every case insulated from ground and are wired up to conductors to constitute a circuit arrangement as shown in Fig. 4.

Figure 6:
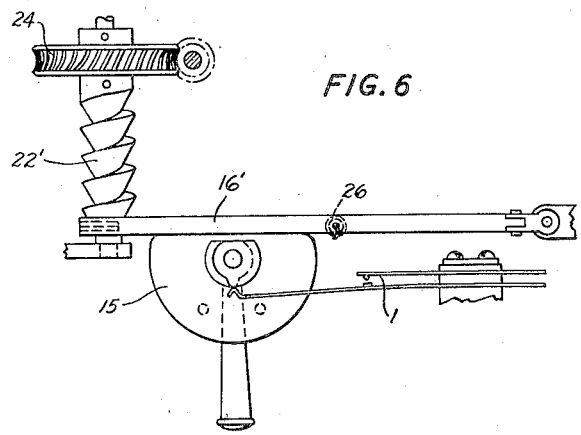

Fig. 6 constitutes a simplified arrangement, the parts being shown with the casing omitted. In Fig. 6 the handle 9, the cam surfaces 11, the pins 13, the contacts 1 and 2 and the cams 3 and 4 are arranged as in Figs. 1 to 3, inclusive. Upon operating the handle to the right or left contact 5, which is not shown in Fig. 6, will be opened and the appropriate contact 1 or 2 closed. The lever 16' is mounted for horizontal movement and a limited degree of vertical movement under influence of spring 26 so that when it is depressed by the cam 15 its end will move over the spirally threaded member 22' which is constantly driven as the vehicle moves by a gear arrangement consisting of a spiral gear 24 driven by a suitable flexible shaft. Upon being depressed the lever 16' falls into the groove in the member 22' and is restored after a predetermined extent of movement of the vehicle.

The arrangements thus make it possible for the operator to be informed of practically any condition which would render his direction indicating system inoperative and, consequently, his reliance upon the system would be increased and its reliability as an instrument for increasing the safety of operation likewise increased.

In discussing the movement of the handle 9 its movement about its pivot will be referred to as a horizontal motion and its motion at right angles thereto as vertical motion with the understanding that these terms are employed in the broader significance to define motion in two distinctive planes, either of which may be vertical or horizontal, or at some angle to the vertical or horizontal, depending upon the mounting of the casing 8.

Figure 7:
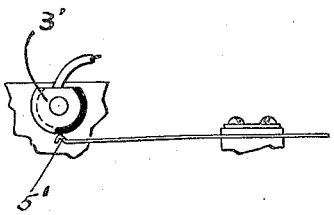
Fig. 7 is a modified contact controlling mechanism.

Fig. 7 shows an arrangement in which the cams 3 and 4 may be replaced by commutator segments, one of which is shown at 3' to close the circuit. Segment 3' and contact 5' constitute the contact 1 and similar elements constitute the contact 2.

Figure 8:
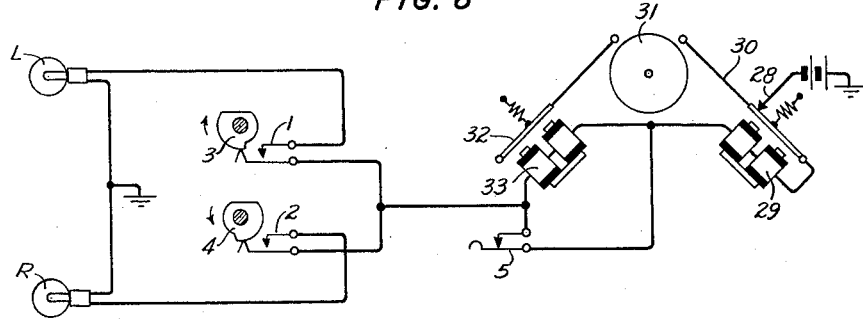
Figs. 8 and 9 are circuit arrangements similar to Fig. 4 in which the two pilot lamps are replaced by two signaling bells or one function bell, respectively, one to inform the operator that the system is working and the other to give warning that it is out of order.

Fig 8 comprises a circuit diagram of a modified arrangement in which a suitable bell or gong is caused by electromagnets to give an appropriate signal to the operator showing that the system is in operative or inoperative condition as the case may be. Parts having similar reference characters are identical with those of Fig. 4. The bell 28 is provided with operating winding 29 consisting of a few turns of low resistance. At times when the contact 5 is closed and one of the lamps L or R is in the circuit the bell 28 will not cause its clapper 30 to strike the gong 31 because insufficient current will flow. If, however, a short circuit exists on the conductor between the winding 29 and one of the lamps L or R, sufficient current will flow to cause the armature to be attracted and ring the bell. Since, however, the winding 28 is of the self-interrupted type, the clapper 30 will vibrate and the bell will ring as long as the contact 5 is closed and the short circuit exists. This will inform the operator that the system is inoperative. If, however, no short circuit exists then the armature 32 will be attracted by its associated electromagnet, which is wound with many turns 33 of fine wire, once for each time that the contact 5 is opened while one of the contacts 1 or 2 is closed. This will cause the gong 31 to give a single stroke or a series of single strokes which will apprise the operator that the system is in correct working condition.

Figure 1:
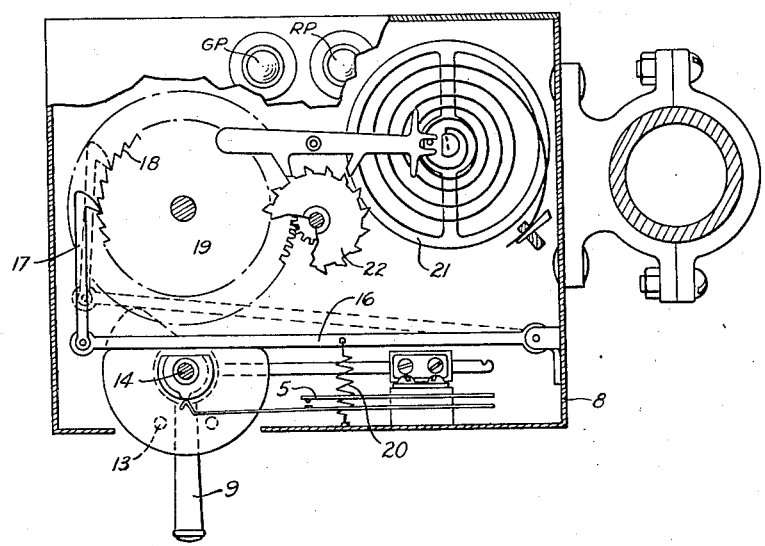
Figure 2:
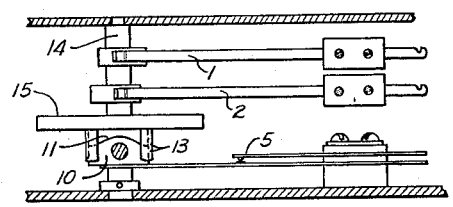
Figure 3:
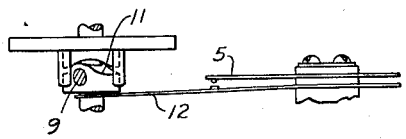
Figure 9:
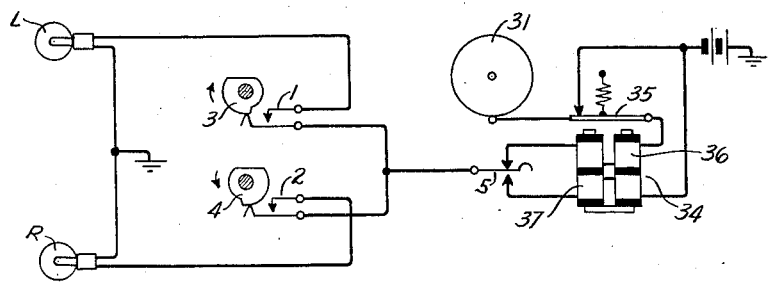
Figure 10:
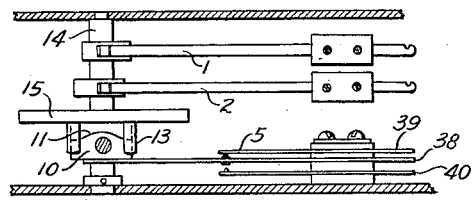
Fig. 10 is a modified form of Fig. 3 with an extra contact designed to work with the circuit of Fig. 9.

In Fig. 9 the high and low resistance windings of the magnets 29 and 33 of Fig. 8 are wound upon a single electromagnet 34 with a single armature 35 connected to the clapper of the gong 31. The upper contact 5 is normally closed when no signal is being given. When handle 9 is moved off central position upper contact 5 is opened and lower contact 5 is closed. When the handle 9 is released the lower contact 5 is opened and the upper contact 5 closed again. One or the other of contacts 1 or 2 will always be closed when the handle is sufficiently off its central position. In the normal condition of contact 5 it closes the circuit from battery through the self-interrupting contact of the armature 35 and the low resistance winding 36 to one or the other of contacts 1 or 2. When one of contacts 1 or 2 is closed under normal conditions, sufficient current does not flow to actuate the armature 35 but, if a short circuit exists between the winding 36 and one of the lamps L or R, the gong is actuated continuously to call attention to this condition. On the other hand, whenever the contact 5 is moved from its upper to its lower position a circuit is closed through the high resistance many turn winding 37 which causes the bell to give a single stroke once each time the contact 5 is in its lower position, while a contact 1 or 2 is closed. This also informs the operator that the system is working correctly. The arrangement of Fig. 2 is modified for cooperation with the arrangement of Fig. 9 as shown in Fig. 10. The lead from the contact 1 or 2 is connected to the metal spring 38, the lead from the low resistance winding 36 is connected to the upper spring 39 and the lead from the high resistance winding 37 is connected to the lower spring 40. The springs 38 and 39 normally hold the upper contact 5 in the make position but whenever the handle 9 is actuated the springs 38, 39 open upper contact 5 and springs 38, 40 close lower contact 5.

What is claimed is:

1. In an indicating system, a main signaling light in circuit with a suitable source of electromotive force, a contact for closing the circuit and two pilot devices also in series in said circuit, one of said pilot devices being a low current device operating to indicate absence of an abnormal open circuit condition and the other pilot device being a high current device operating to indicate an abnormal short-circuit condition, a shunt contact for said low current device, and operating mechanism for closing said first named contact including means to open said shunt contact during a portion of the time of the closure of said first named contact.

2. In a direction indicating signaling system, a circuit including a direction indicating signaling light, contacts for closing a circuit therethrough, an operating member for closing said contact, means whereby said operating member upon being operated temporarily closes a path through a low current pilot device to indicate a closed circuit condition in combination with an additional high current pilot device not glowing under normal conditions but connected in circuit to be energized to give a signal upon the occurrence of a short circuit around the signaling light.

3. In a direction indicating signaling system, circuits including right and left-hand turn indicating lamps, and a pilot light, contacts for each lamp respectively, an operating member for closing said contacts, and a handle for moving said member, a device controlled by preliminary movement of said handle and by its continued movement to control the pilot light, a spring connected to said handle whereby after being moved to its extreme position and released it is partially restored by the tension of said spring to cancel the indication of said pilot light and additional mechanism for maintaining the main signaling light illuminated for a further period of time after the pilot light ceases to glow.

4. In a signal indicating system, a handle mounted for horizontal rotational movement and vertical sliding movement, a cam surface which forces said handle to move vertically upon being rotated horizontally, a normally closed contact operated by vertical movement of said handle, other normally open contacts, one of which is selectively operated by horizontal movement of said handle, and a circuit including said contacts, operation of said first contact opening the circuit at said first contact and operation of one of said second contacts closing the circuit at said second contact, in combination with a current energizable device in shunt to said normally closed contact.

5. A turn indicating signaling system comprising an operating handle mounted for horizontal movement, a cam surface for causing said handle to move vertically upon being moved horizontally, a contact controlled by vertical movement of said handle, a pilot lamp included in a conducting path controlled by movement of said contact, other contacts mounted to be selectively controlled by horizontal movement of said handle, signal lamps controlled by said other contacts respectively, and a circuit arrangement whereby said pilot lamp operates at times to indicate the operative condition of said signal lamps.

6. A direction indicating signaling system comprising a source of electromotive force, a high current device and a low current device in series therewith, branch circuits extending from said devices to the opposite terminal of said source through main signaling lamps, and selective contacts in combination with mechanism for controlling said selective contacts to energize one of said signaling lamps and said low current device, said high current device remaining energized when said signaling lamp is energized.

7. In an indicating system circuits including right and left hand turn indicating lamps, pilot bell means, contacts for each lamp respectively, an operating member for closing said contacts, a handle for moving said member, a device controlled by preliminary movement of said handle in a direction to move said member and by its continued movement to control the pilot bell means, connections whereby a normal circuit condition upon the circuit of one of said lamps gives one kind of bell signal when said circuit is connected to battery by its contact, connections whereby a short upon said circuit causes said bell signal to be abnormal and an opening of said circuit causes said bell signal to fail to sound.

RAYMOND A. HEISING.